United States Patent [19]

Smith

[11] 3,954,288
[45] May 4, 1976

[54] PIPE FITTING WITH SELF-TESTING SEALS AND METHOD

[75] Inventor: Joseph B. Smith, Berea, Ohio

[73] Assignee: The Pipe Line Development Co., Cleveland, Ohio

[22] Filed: Mar. 13, 1974

[21] Appl. No.: 450,868

[52] U.S. Cl. .................................. 285/93; 285/373; 137/318
[51] Int. Cl.² ........................................ F16L 55/16
[58] Field of Search ............ 285/93, 373, 197, 198, 285/199, 156, 121; 137/317, 318

[56] References Cited
UNITED STATES PATENTS

| | | | |
|---|---|---|---|
| 1,160,284 | 11/1915 | Headly | 285/373 |
| 1,369,913 | 3/1921 | Brunhoff | 285/373 X |
| 2,899,984 | 8/1959 | Gaffin | 285/373 X |
| 3,550,638 | 12/1970 | Smith | 285/373 |
| 3,827,448 | 8/1974 | Alba | 137/318 X |

FOREIGN PATENTS OR APPLICATIONS

| 19,399 | 1903 | United Kingdom | 285/121 |

*Primary Examiner*—H. Hampton Hunter
*Attorney, Agent, or Firm*—McNenny, Farrington, Pearne & Gordon

[57] ABSTRACT

A split coupling for repairing, hot tapping, or joining pipelines, and particularly underwater pipelines, is disclosed. The coupling comprises a pair of members each having semicylindrical inner surfaces and a pair of faces adapted to oppose the faces of the other member. A first gasket continuously extends circumferentially on each semicylindrical surface and along the faces, with the face extending portion of each first gasket being adapted to mate with the face extending portion of the other first gasket. A second gasket is spaced from each first gasket. Each second gasket continuously extends circumferentially on each semicylindrical surface and along the faces with the face extending portion of each second gasket being adapted to mate with the face extending portion of the other second gasket. Ports are drilled through the coupling and into a zone defined by the first and second gaskets. When the coupling is applied to a pipeline, a seal is effected by at least the outermost gasket to block pipeline leakage within the innermost gasket. The gaskets, however, are designed to retain pressure in the zone so that the zone may be pressurized through the ports to pressure-test the seal effected by at least the outermost gasket.

15 Claims, 6 Drawing Figures

U.S. Patent  May 4, 1976  3,954,288
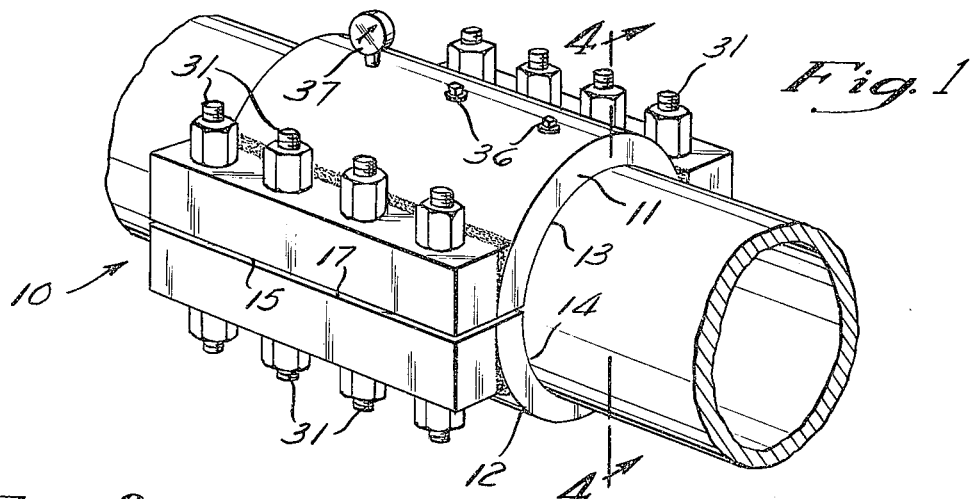
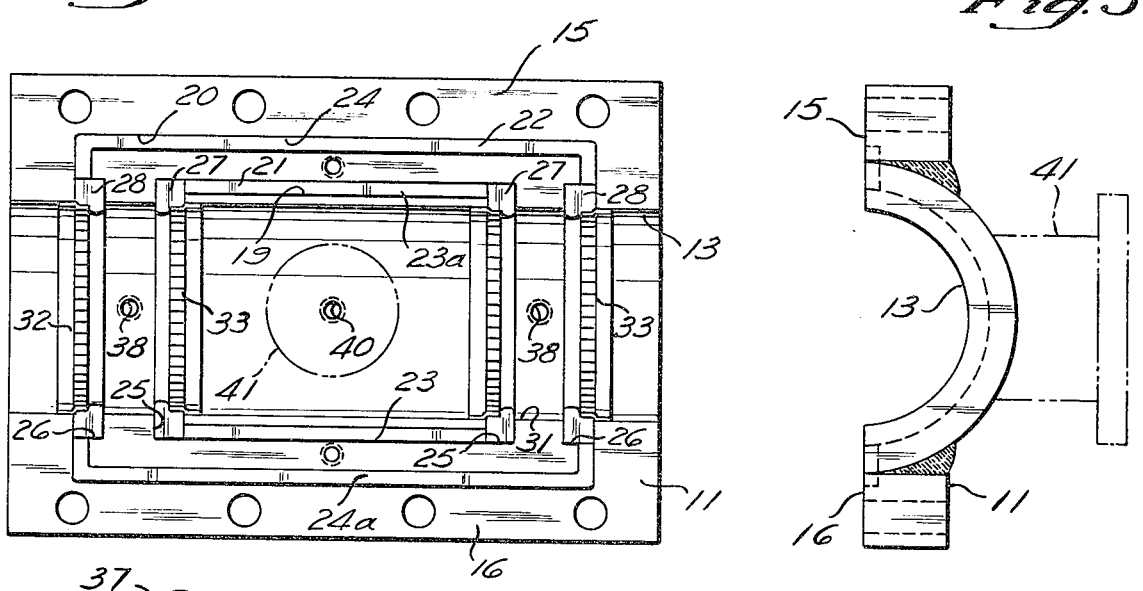
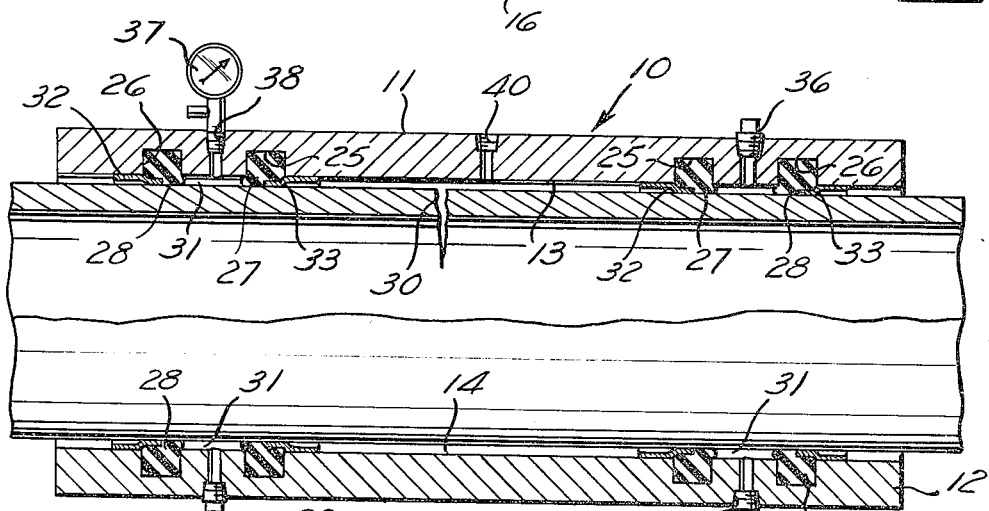
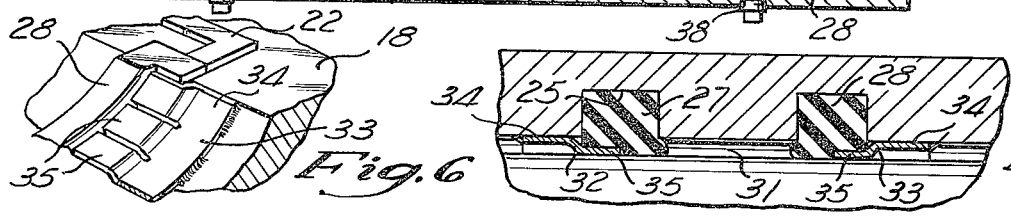

PIPE FITTING WITH SELF-TESTING SEALS AND METHOD

BACKGROUND OF THE INVENTION

This invention relates to pipeline repair or hot tapping couplings, and more particularly to a coupling which may be applied to an underwater pipeline and which may be pressure-tested while the pipeline is shut off.

Split couplings have been used for many years to repair above-ground and subsurface pipelines. It was not until the past 10 years that split couplings having gasket seals have been applied to underwater pipelines to repair or hot-tap those pipeines. There are many problems involved in applying couplings to underwater pipelines due to the massiveness of the coupling, the conditions under which the divers must work, and the fact that such pipelines are normally encased in concrete which is cured under almost ideal conditions. Because of the depths, divers can spend only 60 to 80 minutes on the bottom. For 60 minutes at 130 feet, a diver has to decompress for nine minutes at 30 feet and 23 minutes at 20 feet. An additional 75 minutes must be spent in a decompression chamber. After decompressing for almost 2 hours, the diver should wait 12 hours before making another device. For 80 minutes on the bottom, the decompression time is 2 hours and 44 minutes. Furthermore, turbulent weather conditions may stir up the bottom to reduce the visibility to substantially zero. The massiveness of the coupling also contributes to the difficult working conditions.

Because of the foregoing problems, and since good underwater welding is considered only 75 to 85 percent as effective as ordinary welding, bolted-on, self-sealing split couplings have been successfully employed for underwater pipeline repair work. Those couplings include a pair of members each having semicylindrical inner surfaces and a pair of flanges adapted to oppose the flanges of the other member. A gasket continuously extends circumferentially on each semicylindrical surface and along the flanges so that when the coupling is applied to the pipe and the flanges are bolted together, the gasket surrounds the area of the pipe to be repaired or hot-tapped to effectively seal that area. While the seal is adequate and eliminates the necessity for seam welding (although such welding is sometimes done as a precautionary measure), it is generally impossible to test the effectiveness of the seal without pressurizing the line. If the coupling is not properly mated, leaks may occur when the line is pressurized, necessitating inspection and repositioning of the coupling. Furthermore, the coupling cannot be pressure-tested by line pressure which exceeds 80 percent or the like of the average yield strength of the pipe as determined by tensile tests, since such internal pressures would not comply with minimum federal safety standards for liquid pipelines.

SUMMARY OF THE INVENTION

This invention overcomes many of the prior art problems noted above by providing a repair or hot-tapping coupling which may be pressure-tested independently of line pressure. This is accomplished by providing a split coupling having a pair of spaced seals which mate with the pipe and with each other to form a chamber which may be pressurized independently of line pressure to test the integrity of at least the outermost seal.

More specifically, the invention provides a split coupling comprising a pair of members each having semicylindrical inner surfaces and a pair of faces adapted to oppose the faces of the other member. A first gasket is positioned in a groove which continuously extends circumferentially on each semicylindrical surface and along the faces so that the face extending portion of each first gasket is adapted to mate with the face extending portion of the other first gasket. A second gasket is positioned in a groove which is spaced from each first gasket. Each second gasket continuously extends circumferentially on each semicylindrical surface and along the faces, with the face extending portion of each second gasket being adapted to mate with the face extending portion of the other second gasket. Ports are drilled through the coupling and into a zone defined by the first and second gaskets. When the coupling is applied to a pipeline, a seal is effected by at least the outermost gasket to block pipeline leakage within the innermost gasket. The gaskets, however, are designed to retain pressure in the zone so that the zone may be pressurized through the ports to pressure-test the seal effected by at least the outermost gasket.

BRIEF DESCRIPTION OF THE DRAWING

FIG. 1 is a perspective view of a coupling embodying the invention, installed on a pipe;

FIG. 2 is a view of the interior of one of the coupling members;

FIG. 3 is an end view of the coupling member illustrated in FIG. 2, showing a flanged T for hot-tapping operations in phantom outline;

FIG. 4 is a cross sectional view, the plane of the section being indicated by the line 4—4 in FIG. 1;

FIG. 5 is an enlarged, cross sectional view showing the pressure zone between innermost and outermost circumferential seals; and FIG. 6 is a fragmentary, perspective view illustrating the juncture between a semicylindrical portion of the seal and a face extending portion of the seal.

DETAILED DESCRIPTION OF THE INVENTION

Referring now to the drawing in greater detail, there is illustrated a split coupling 10 according to this invention. The coupling 10 comprises a pair of members 11 and 12 each having a semicylindrical inner surface 13 and 14 and each having a pair of faces 15, 16, 17, and 18. Each member 11 and 12 is provided with inner and outer grooves 19 and 20, which are adapted to retain inner and outer gaskets 21 and 22. The grooves 19 and 20 have face extending portions 23 and 24 which communicate with semicylindrical portions 25 and 26. Accordingly, the gaskets 21 and 22 have semicylindrical portions 27 and 28, respectively, and face extending portions 23a and 24a. The gaskets 21 and 22 are of rubberlike material and, where fluid such as oil or the like is to be contained, they are formed of material that is impervious to such fluid, such as neoprene.

In order to seal a leak 30 in the pipe, the members 11 and 12 are applied thereto and firmly fastened by bolts 31. Thus, any axial flow along the pipe is sealed by the gaskets 27 and 28 and radial flow is impeded by the gasket portions 23a and 24a. Additional confining means is provided for the semicylindrical gasket portions 27 and 28 so that a zone 31 between those portions may be pressurized. Such additional confining means comprises girdering strips 32 and 33 which, as may be seen most clearly in FIG. 6, include a base portion 34 welded to the semicylindrical inner surface of each member and a multiplicity of lips 35 overlying part of the axial extent of the gaskets 27 and 28. When the members 11 and 12 are assembled with this construction, the pipe first engages the lips 35 and bends them inwardly, causing flow of the partially confined gasket material against the pipe in the zone not covered by the lips of the girdering. This presses and flows the gasket material into complete, tight sealing engagement with the pipe and, at the same time, traps the gaskets 27 and 28 against axially opposite extrusion from fluid pressure in the zone 31. Thus, the zone 31 (which also includes the area between the gasket portions 21 and 22) comprises a pressure chamber for testing the integrity of at least the gasket 28 prior to and instead of pressurizing the pipeline itself.

The foregoing is accomplished by applying the members 11 and 12 to a pipeline so that the gaskets 27 straddle the leak, as is shown in FIG. 4. A plug (such as the plug 36) is removed and the zone 31 is pressurized to, for example, 2880 psi hydrostatic or a pressure at least as great as the normal line pressure in the line. This pressure may be read by a conventional pressure gauge 37 which is threaded into one of a plurality of ports 38 drilled into the zone 31. The installer may then hold this pressure for, for example, one minute and be assured that at least the gasket 28 is retaining its seal, since, in effect, the gaskets 27 are unidirectional and are intended primarily to retain pressure in the zone 31, rather than in the area of the pipe fault.

After the pressure is relieved in the zone 31, the zone may be filled with a sealant, such as epoxy cement, although such an additional seal is generally not necessary.

After the seal is tested, sea water may be flushed from the space between the gaskets 27 by injecting a high viscosity sealant through a port 40.

As was previously indicated, a pipeline may be hot-tapped by providing a coupling having a T 41 associated therewith. The seals are pre-pressurized and are tested in the previously described manner. Upon completion of the leak test, the tapping chamber, which comprises the area between the gaskets 27 and the T 41, is reduced to a pressure equal to that in the "hot" pipeline. The tap is then made through the T, while hydraulic fluid is circulated through the tapping chamber for cooling and lubrication purposes and for maintaining main line pressure throughout the tapping operation. When the tap has been achieved, the cutter is retrieved and a ball valve (not shown) provided on the T is closed and the pressure is bled off to permit removal of the tapping tool. A blind flange with bleed valves or any other tie-in connections desired are then installed on the ball valve.

Although a preferred embodiment of this invention is illustrated, it is to be understood that various modifications and rearrangements of parts may be restored to without departing from the scope of the invention disclosed and claimed herein.

What is claimed is:

1. A coupling for repairing, hot tapping, or joining pipelines, comprising a sleeve having a cylindrical inner surface, a first pair of spaced gaskets circumferentially extending on said inner surface, a second pair of spaced gaskets circumferentially extending on said surface and being axially spaced from said first pair, said first and second pairs of spaced gaskets respectively defining first and second axially spaced pressurizable zones when said coupling is applied to a pipe, said first and second pairs of gaskets being capable of containing pressure within said first and second zones respectively in excess of expected on-steam pressure, porting means through said coupling and into said zones, whereby when said coupling is applied to a pipeline said first and second pairs of spaced gaskets may be pressure-tested independently of on-steam line pressure by introducing a fluid through said porting means and into said zones at a pressure above expected on-stream line pressure.

2. A coupling according to claim 1, wherein the gaskets include confining means for preventing extrusion of gasket material along the pipe from fluid pressure in their respective zones.

3. A split coupling for repairing, hot tapping, or joining pipelines, comprising a pair of members each having semicylindrical inner surfaces and a pair of faces adapted to oppose the faces of the other member, means to join said members into a single unit to form a cylindrical interior surface adapted to span the circumference of a pipeline, first gasket means continuously extending circumferentially on each said inner surface, adjacent each end, and along said faces, with the face extending gasket means being adapted to seal between opposed faces, second gasket means spaced from said first gasket means, said second gasket means continuously extending circumferentially on each said inner surface, adjacent each end, and along said faces, with the face extending gasket means being adapted to seal between opposed faces, said gasket means defining a pressurizable zone therebetween, including interconnected areas adjacent each end of said member and along each face of said members, porting means through said coupling and into said zone, whereby when said split coupling is applied to a pipeline said first and second gasket means may be pressure-tested independently of on-stream line pressure by introducing a fluid through said porting means and into said zone at a pressure above expected on-stream line pressure.

4. A split coupling according to claim 3, wherein the circumferential gasket means include means for preventing extrusion of gasket material along the pipe from fluid pressure within said pressurizable zone.

5. A split coupling according to claim 4, wherein the extrusion preventing means of said circumferentially extending portions of said first and second gasket means include a series of flexible girdering strips joined to the inside of said members, outside of said zone and extending toward said zone partially across the inside surfaces of said circumferentially extending portions of said gasket means.

6. A split coupling according to claim 3, including a pressure gauge connected to said porting means.

7. A split coupling according to claim 3, including additional porting means through said coupling and into another zone defined by the innermost gasket means.

8. A method of isolating and pressure-testing a sealed area about the circumference of a limited length of a pipeline in service undersea, comprising the steps of providing a pair of mating sleeves adapted to be secured about the periphery of a limited length of the pipeline, each of said sleeves being provided at each of its ends with a pair of spaced, circumferential seals, submerging said sleeves in the sea and disposing said sleeves about the undersea pipeline in face-to-face relation and securing said sleeves together in a manner such that said respective pairs of seals form a continuous, circumferential zone inwardly bounded by the exterior of the pipe and outwardly bounded by the interior of the sleeves, pressurizing the circumferential zones formed by said seals with a pressure independent of and at least equal to the pressure existing in said pipeline to test the sealing effectiveness of said seals whereby the pressure capacity of at least the longitudinally outwardmost seals in sealingly isolating an area outward of said pipe and inward of said sleeve elements is tested.

9. A method as set forth in claim 8, wherein said circumferential zones are filled with sealant directed into said zones through port means through one of said sleeves.

10. A method as set forth in claim 8, wherein said circumferential seals of each sleeve are confined by oppositely facing means for preventing extrusion thereof under fluid pressure in said zones.

11. A method as set forth in claim 10, wherein said confining means is arranged to be moved radially inwardly when said sleeves are disposed about said pipe to cause the material of said seals to flow into tight sealing engagement with said pipeline.

12. A method as set forth in claim 8, wherein the pressure introduced into said zones is directed through an external port, said zones being exposed to a pressure in excess of that normally expected in said pipeline.

13. A method as set forth in claim 8, wherein said sleeves are each provided with mating longitudinal faces, the sleeves being assembled over the pipeline with the longitudinal faces of each sleeve facing corresponding faces of the opposite sleeve, a pair of spaced, longitudinal seals being provided between each set of oppositely facing, longitudinal sleeve faces to define a longitudinal pressure testing zone therebetween, and pressurizing the longitudinal zones formed by said longitudinal seals with a pressure independent of the pressure existing in said pipeline to test their sealing effectiveness, whereby the pressure capacity of at least radially outwardmost seals is tested.

14. A method as set forth in claim 13, wherein said circumferential seals and said longitudinal seals are arranged on said sleeves in a manner by which said circumferential and longitudinal pressure testing zones are interconnected, and testing said zones simultaneously by introducing pressurized fluid to a single port communicating with one of said zones.

15. A method as set forth in claim 14, wherein said circumferential and longitudinal zones are filled with a sealant through port means in one of said sleeves.

* * * * *

UNITED STATES PATENT AND TRADEMARK OFFICE
CERTIFICATE OF CORRECTION

PATENT NO. : 3,954,288
DATED : May 4, 1976
INVENTOR(S) : Joseph B. Smith

It is certified that error appears in the above-identified patent and that said Letters Patent are hereby corrected as shown below:

Column 1, line 15, "pipeines" should be --pipelines--; and line 27, "device" should be --dive--.

Column 3, line 57, "restored" should be --resorted--.

Column 4, line 4, "on-steam" should be --on stream-- and line 8, "on-steam" should be --on-stream--.

Signed and Sealed this

Tenth Day of August 1976

[SEAL]

Attest:

RUTH C. MASON
Attesting Officer

C. MARSHALL DANN
Commissioner of Patents and Trademarks